Oct. 29, 1935.  W. KOHLHAGEN  2,018,677
SYNCHRONOUS ELECTRIC MOTOR AND ROTOR THEREFOR
Filed June 8, 1934
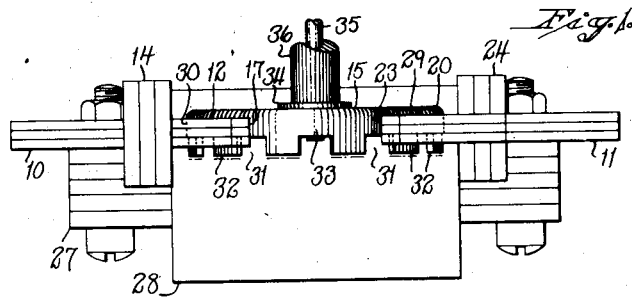
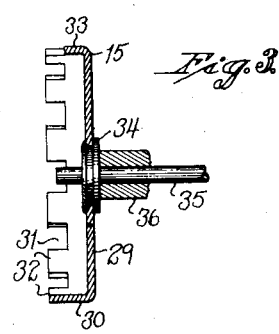
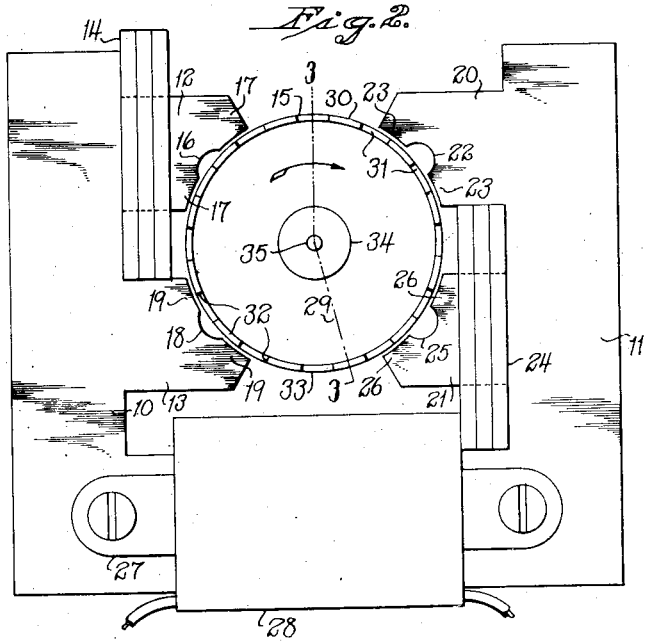
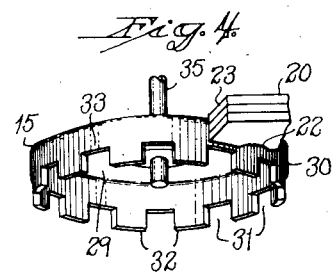
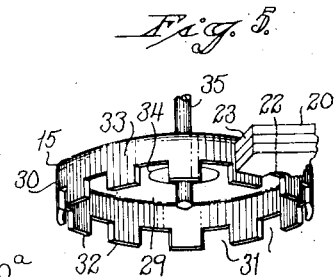
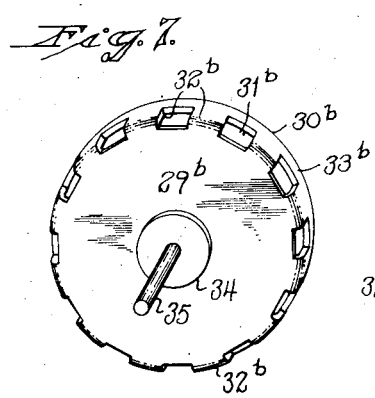
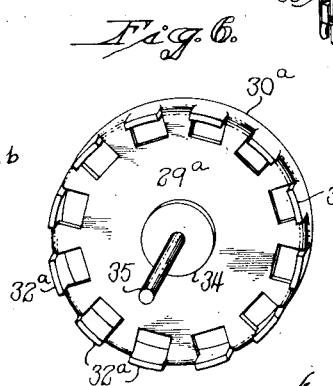

Patented Oct. 29, 1935

2,018,677

UNITED STATES PATENT OFFICE 2,018,677

SYNCHRONOUS ELECTRIC MOTOR AND ROTOR THEREFOR

Walter Kohlhagen, Waterbury, Conn.

Application June 8, 1934, Serial No. 729,597

2 Claims. (Cl. 172—275)

This invention relates to rotor-units for synchronous electric motors, and also to such rotor-units when combined with a stator-structure of the rotating or shifting field type. The salient features of the present invention resolve themselves in the main around a rotor-unit having novel characteristics.

One of the objects of the present invention is to provide a superior self-starting synchronous motor characterized by ample synchronous torque combined with sufficient self-starting torque for bringing the rotor up to synchronous speed, but insufficient to break through the synchronous interlock of the rotor so as to cause the same to operate at speeds in excess of its intended synchronous speed.

A further object is to provide a superior self-starting synchronous electric motor which may be produced at a low cost for manufacture.

Another object is to provide a rotor combining in a single unit, superior hysteresis and reaction characteristics to thus render it admirably suited for use in connection with field structures producing rotating field effects.

A still further object is to provide a superior rotor which may be conveniently and economically manufactured.

Other objects and advantages will appear to those skilled in the art from the following, considered in conjunction with the accompanying drawing and the appended claims.

In the accompanying drawing:

Fig. 1 is a top edge view of a self-starting synchronous motor embodying the present invention;

Fig. 2 is a face view thereof;

Fig. 3 is a broken sectional view taken on the line 3—3 of Fig. 2;

Fig. 4 is a perspective view of the rotor of the preceding figures and schematically showing in connection therewith a salient pole of a stator-structure, the salient pole and rotor being indicated in relative positions before synchronous speed has been reached;

Fig. 5 is a view corresponding to Fig. 4, but showing the relative locations of the rotor and salient pole when the rotor is operating at synchronous speed;

Fig. 6 is a perspective view of another form of rotor embodying the present invention; and Fig. 7 is a similar view of still another form of rotor embodying the present invention.

The particular self-starting synchronous electric motor herein chosen for illustration includes complementary pole-pieces 10 and 11, preferably laminated and formed of magnetic material, such as soft iron. The pole-piece 10 is provided with two inwardly-projecting pole-arms 12 and 13, the former of which is provided with so-called shading-coils 14 or other suitable phase-splitting device, and each of which has its inner end concaved to substantially conform to the curvature of a rotor 15 to be more fully hereinafter described. The pole-arm 12 is provided with a shallow notch 16 to divide it into two complementary salient-poles 17—17. Similarly, the pole-arm 13 is notched as at 18 to produce upon the inner end of the said pole-arm two complementary salient-poles 19—19.

The pole-piece 11, like the pole-piece 10, is provided with two inwardly-extending pole-arms 20—21, each of which has its inner edge concaved to substantially conform to the curvature of the adjacent periphery of the rotor 15. The pole-arm 20 complements the pole-arm 13 of the pole-piece 10 and is provided with a relatively-deep notch 22 dividing it into two complementary salient-poles 23—23. The pole-arm 21 just before referred to complements the pole-arm 12 of the pole-piece 10 and is similarly provided with a plurality of plate-like members of copper or similar material functioning as a shading-coil 24. The inner end of the pole-arm 21 is, as shown, formed with a notch 25 corresponding to the notch 22 before referred to, to provide two complementary salient-poles 26—26.

The respective lower ends of the pole-pieces 10 and 11 are interconnected by a laminated core 27 mounting an energizing-coil 28 adapted to be connected to a source of alternating current of commercial voltage and frequency.

The rotor 15 before referred to is of cup-shaped form and is struck up from sheet (magnetic) metal preferably high-carbon steel (above 0.75% carbon, optimum about 0.90%) unhardened by heat treatment. As thus struck up, the rotor comprises a disk-like bottom wall 29 and an annular flange 30. The edge of the annular flange 30 just referred to is cut out or notched as at 31 at twelve (more or less) equidistant points to thus create an equal number of teeth 32 extending in a direction substantially parallel with the axis of rotation of the rotor. The notches 31 just referred to extend approximately halfway the width of the flange 30 and thus leave the rotor with a smooth circumferential portion 33 which, for the purpose of convenience of description may be characterized as an annular hysteresis portion. Similarly, the portion of the rotor in which the teeth 32 are formed may be characterized as the annular "reaction" portion of the rotor.

The rotor may be mounted for rotation within the field of influence of the pole-arms 12—13 and 20—21 in any approved manner, such, for instance, as by providing the rotor with a staked-in bushing 34 having driven into it a shaft 35 journaled in a suitable bearing such, for instance, as 36, shown in Fig. 1 of the drawing. A pinion (not shown) or other suitable means may be mounted upon the shaft 35 for taking off the power of the rotor for driving a clock or other desired object.

The rotor of the present invention may be employed in connection with a wide variety of field or stator structures, such, for instance, as those shown but not specifically claimed in my copending applications, Serial Nos. 706,805 and 718,891, respectively filed January 16, 1934 and April 4, 1934. In the present instance, however, the rotor is mounted with freedom for slight axial movement forwardly from the position in which it is shown by full lines in Fig. 1 substantially into the position in which it is indicated by broken lines in the same figure. When alternating current of proper voltage and frequency is initially supplied to the energizing-coil 28, a rotating-field effect will be created in the substantially-circular space circumscribed by the inner faces of the polar-arms 12—13 and 20—21, owing to the action of the shading-coils 14 and 24. This rotating or shifting field effect will exert a turning effort upon the rotor in the direction indicated thereupon in Fig. 2.

During the initial starting-up of the rotor 15 and before the same reaches synchronous speed, the magnetic impulses from the salient-poles of the stator-structure will, of course, on occasion occur when one or more of the notches 31 of the rotor is in line with the said salient-poles. When this occurs a slight forward displacement of the rotor will take place from its normal position, as shown schematically in Fig. 5, to the position in which it is shown in Fig. 4. This action occurs only during a very brief interval during the starting period and serves to reduce the tendency of the rotor to magnetically interlock with the salient-poles of the stator, and thus facilitates the speeding-up of the rotor to its intended synchronous speed. Once synchronous speed is reached, the rotor will rotate in substantially the plane in which it is shown in Figs. 1 and 5, in which the salient-poles of the stator-structure overlie portions of both the hysteresis portion 33 of the rotor and the reaction portion thereof comprising the annular series of teeth 32.

In order to provide a combined hysteresis and reaction rotor, it is feasible, instead of notching the flange of the rotor, as in the structure above described, to strike out a portion of the bottom wall 29$^a$, as shown in Fig. 6, to provide salient-teeth 32$^a$ projecting in a direction opposite to the flange 30$^a$ of the rotor, which teeth, however, extend as in the preceding type of rotor in a direction substantially parallel with the axis thereof.

Another mode of providing a rotor having both an annular hysteresis portion and an annular toothed or reaction portion is illustrated in Fig. 7, in which the metal adjacent the junction of the bottom wall 29$^b$ and the offsetting flange 30$^b$ is punched out as at 31$^b$ to thus provide an annular series of salient-teeth 32$^b$ and a substantially-smooth annular hysteresis portion 33$^b$. In this instance, however, the hysteresis portion 33$^b$ is located adjacent the free end of the flange 30$^b$ in contradistinction to the location of the hysteresis portion in the rotor shown in Figs. 1 to 5 inclusive.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. In a self-starting synchronous electric motor, the combination with a stator-unit producing a shifting field effect and having both shaded and unshaded pole-arms respectively divided into a plurality of salient-poles; of a rotor-unit mounted for rotation in the magnetic field of the said stator-unit and having an annular peripheral hysteresis portion substantially smooth and free of salient poles, and also having an annular reaction portion comprising a series of teeth formed integral with the said substantially-smooth portion and extending in a direction substantially parallel with the axis of the rotor-unit, the said rotor-unit being composed of magnetic material having a remanent magnetic factor substantially equal to unhardened carbon steel having a carbon-content of approximately 0.90%.

2. A combination hysteresis and reaction rotor of cup-shaped form and composed of soft steel having a carbon content of about 0.90% and having a flange extending substantially parallel with the axis of the rotor, the said rotor being shaped to provide an annular series of reaction teeth extending substantially parallel with the axis of the rotor, and also an annular hysteresis portion substantially smooth and free of salient poles.

WALTER KOHLHAGEN.